US012631243B2

(12) United States Patent
Tamura et al.

(10) Patent No.: US 12,631,243 B2
(45) Date of Patent: May 19, 2026

(54) BENDING MESHING TYPE GEAR DEVICE

(71) Applicant: SUMITOMO HEAVY INDUSTRIES, LTD., Tokyo (JP)

(72) Inventors: Mitsuhiro Tamura, Yokosuka (JP); Masahiro Watanabe, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/494,996

(22) Filed: Oct. 26, 2023

(65) Prior Publication Data

US 2024/0159304 A1     May 16, 2024

(30) Foreign Application Priority Data

Nov. 15, 2022     (JP) ................................. 2022-182696

(51) Int. Cl.
*F16H 49/00*          (2006.01)
*F16H 55/06*          (2006.01)

(52) U.S. Cl.
CPC ........... *F16H 49/001* (2013.01); *F16H 55/06* (2013.01)

(58) Field of Classification Search
CPC ............................... F16H 49/001; F16H 55/06
USPC .......................................................... 74/640
See application file for complete search history.

(56) References Cited

U.S. PATENT DOCUMENTS

| | | | | |
|---|---|---|---|---|
| 11,085,509 B2 * | 8/2021 | Shirouzu | ................. | F16H 55/17 |
| 11,268,604 B2 * | 3/2022 | Tamura | ...................... | F16H 1/10 |
| 11,274,736 B2 | 3/2022 | Tamura et al. | | |
| 2002/0178861 A1 * | 12/2002 | Kobayashi | ............ | F16H 49/001 |
| | | | | 74/640 |
| 2018/0266533 A1 * | 9/2018 | Tamura | ................. | F16H 49/001 |
| 2019/0160654 A1 * | 5/2019 | Moritani | .................. | B25J 18/00 |
| 2020/0025277 A1 * | 1/2020 | Tamura | ................... | F16H 55/06 |
| 2020/0072318 A1 * | 3/2020 | Shirouzu | ............ | F16H 55/0833 |
| 2020/0325976 A1 * | 10/2020 | Tamura | .................. | F16H 55/06 |
| 2024/0167554 A1 * | 5/2024 | Tamura | .................. | F16H 55/06 |

FOREIGN PATENT DOCUMENTS

| | | | | | |
|---|---|---|---|---|---|
| CN | 113417986 A | * | 9/2021 | | |
| DE | 102021130960 A1 | | 6/2022 | | |
| JP | 2014199119 A | | 10/2014 | | |
| JP | 2018-155313 A | | 10/2018 | | |
| JP | 2022085129 A | | 6/2022 | | |
| WO | WO-2019155831 A1 | * | 8/2019 | ............... | F16H 1/32 |

* cited by examiner

*Primary Examiner* — William C Joyce
(74) *Attorney, Agent, or Firm* — HEA Law PLLC

(57)          ABSTRACT
A bending meshing type gear device includes a wave generator, a bending gear that is bent and deformed by the wave generator, and a meshing gear that meshes with the bending gear, in which the meshing gear is formed of a first resin having a glass transition point lower than about 140° C., the bending gear is formed of a first high thermal conductivity material having higher thermal conductivity than the first resin, and the wave generator is formed of a second high thermal conductivity material having higher thermal conductivity than the first high thermal conductivity material.

14 Claims, 2 Drawing Sheets

BENDING MESHING TYPE GEAR DEVICE

CROSS-REFERENCE TO RELATED APPLICATIONS

This application claims priority to Japanese Patent Application No. 2022-182696, filed on Nov. 15, 2022, which is incorporated by reference herein in its entirety.

BACKGROUND

Technical Field

A certain embodiment of the present disclosure relates to a bending meshing type gear device.

Description of Related Art

Weight saving of a gear device may be required depending on application of the gear device. In order to meet this requirement, a bending meshing type gear device disclosed in the related art includes a bending gear that is bent and deformed by a wave generator, and a meshing gear that meshes with the bending gear, in which the meshing gear is formed of a resin.

SUMMARY

A bending meshing type gear device according to an embodiment of the present disclosure is a bending meshing type gear device including a wave generator, a bending gear that is bent and deformed by the wave generator, and a meshing gear that meshes with the bending gear, in which the meshing gear is formed of a first resin having a glass transition point lower than about 140° C., the bending gear is formed of a first high thermal conductivity material having higher thermal conductivity than the first resin, and the wave generator is formed of a second high thermal conductivity material having higher thermal conductivity than the first high thermal conductivity material.

DETAILED DESCRIPTION

Figure 1:
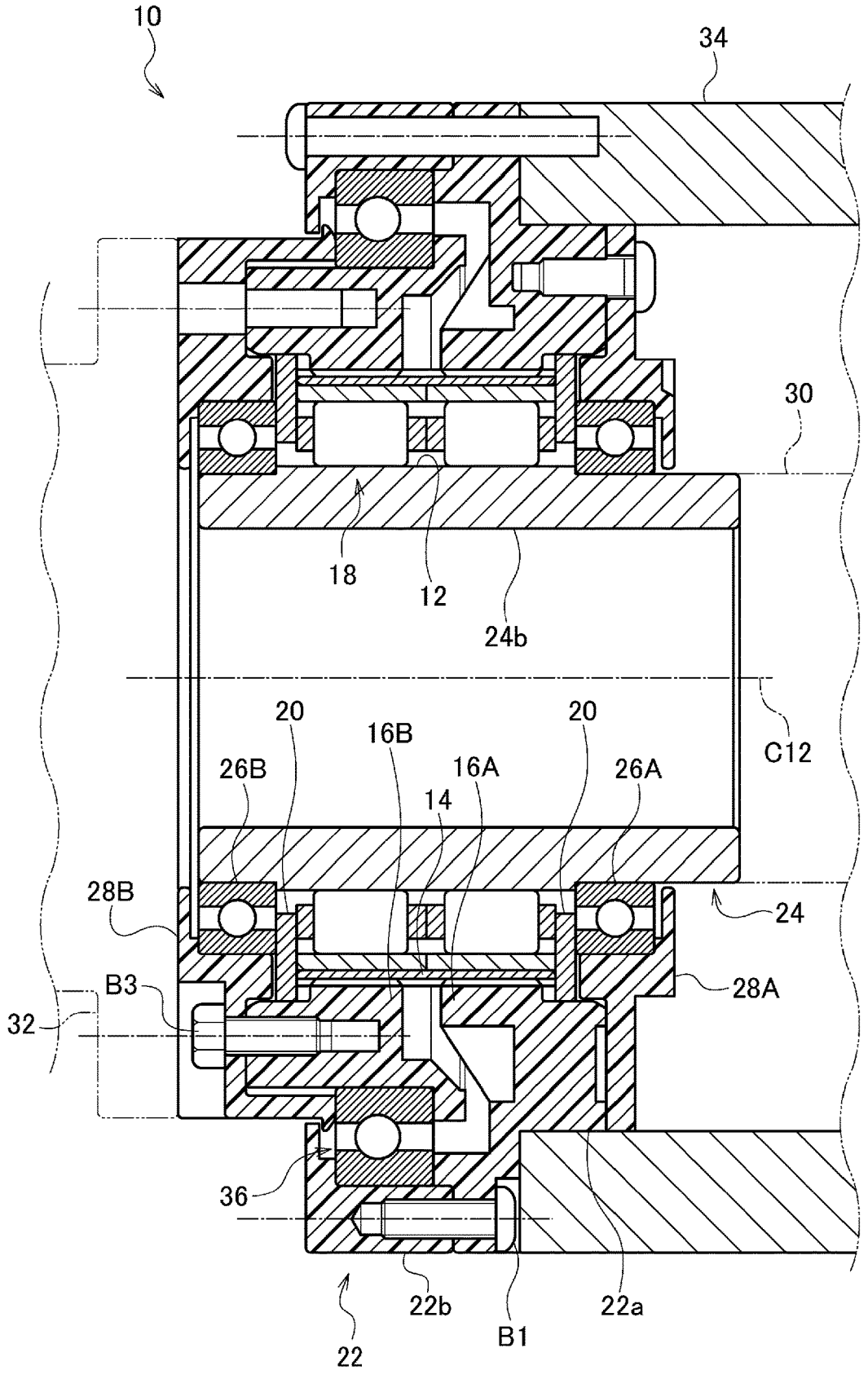
FIG. 1 is a side sectional view illustrating a gear device according to an embodiment.

The inventors of the present application have found a new idea for suppressing an effect on durability of the meshing gear while aiming a low cost of the meshing gear in the bending meshing type gear device.

It is desirable to provide a bending meshing type gear device that can suppress an effect on durability of a meshing gear while aiming a low cost of the meshing gear.

Hereinafter, an embodiment of the present disclosure will be described. The same components will be denoted by the same reference numerals, and duplicate description will be omitted. In each drawing, components are omitted, enlarged, or reduced, as appropriate, for convenience of description. The drawings are viewed in accordance with directions of the reference numerals.

First, a background of an idea of a gear device according to an embodiment of the present disclosure will be described. In the case of forming a meshing gear of a resin, heat generated by meshing between a gear pair (a bending gear and the meshing gear) normally affects durability of the meshing gear significantly. Thus, PEEK that has significantly excellent thermostability is normally used as the resin constituting the meshing gear so that sufficient durability can be obtained regardless of the effect of the heat. In addition, in a case where the meshing gear is formed of PEEK, the bending gear and a wave generator are normally formed of steel. While PEEK is optimal from a viewpoint of durability, PEEK has a problem of a significantly high cost. Therefore, the inventors of the present application have reviewed an idea for suppressing the effect on the durability of the meshing gear while aiming a low cost of the meshing gear.

In a case where thermostability of the meshing gear is simply set to be lower than that of PEEK in order to aim a low cost of the meshing gear, it is inevitable that the durability of the meshing gear is significantly damaged because of the heat generated in a meshing part of the gear pair. As a measure to deal with this, the inventors of the present application have perceived a new idea that setting thermal conductivity of the wave generator to be higher than that of the bending gear while setting the thermostability of the meshing gear to be lower than that of PEEK is effective. Accordingly, thermal conduction of the heat generated in the gear pair is promoted through the wave generator, compared to that in the case of setting the wave generator to have the same thermal conductivity as the bending gear. Thus, thermal dissipation that is release of the heat of the gear pair to the outside can be increased. By increasing the thermal dissipation of the gear pair in such a manner, a temperature of the gear pair can be decreased, compared to that in the case of setting the wave generator to have the same thermal conductivity as the bending gear. Furthermore, even in a case where the thermostability of the meshing gear is decreased in order to aim a low cost of the meshing gear, the effect of the heat on the durability of the meshing gear can be suppressed, compared to that in the case of setting the wave generator to have the same thermal conductivity as the bending gear. Hereinafter, details of the gear device of the embodiment conceived based on this new idea will be described.

FIG. 1 will be referred to. A bending meshing type gear device 10 (hereinafter, simply referred to as the gear device 10) is incorporated in a driven machine as a part of the driven machine. The driven machine includes, for example, various machines such as an industrial machine (a machine tool, a construction machine, and the like), a robot (an industrial robot, a service robot, and the like), and a transport machine (a conveyor, a vehicle, and the like).

In the present embodiment, the bending meshing type gear device 10 of a tubular type will be described. The gear device 10 includes a wave generator 12, a bending gear 14 that is bent and deformed by the wave generator 12, meshing gears 16A and 16B that mesh with the bending gear 14, a wave generator bearing 18 disposed between the wave generator 12 and the bending gear 14, and a regulating member 20 that regulates a movement of the bending gear 14 in an axial direction. In addition, the gear device 10 includes a casing 22, bearings 26A and 26B that support a wave generator shaft 24 including the wave generator 12, and bearing housings 28A and 28B that support the bearings 26A and 26B. Hereinafter, a direction along a center line C12 of the wave generator 12 will be simply referred to as the axial direction, and a direction of a radius and a circumferential direction about the center line C12 as a center will be simply referred to as a radial direction and a peripheral direction. In addition, for convenience of description, one side in the axial direction (a right side of the page of FIG. 1) will be referred to as an input side, and the other side in the axial direction will be referred to as a counter-input side.

The gear device 10 includes an input member into which rotation is input from a drive source 30 (first external member) on the outside, an output member that outputs rotation to a driven member 32 (second external member) on the outside, and a fixing member fixed to a fixed member 34 (third external member) on the outside. Here, an example in which the input member is the wave generator shaft 24 (wave generator 12), the output member is the bearing housing 28B, and the fixing member is the casing 22 will be described. The drive source 30 is, for example, a motor and may also be a gear motor, an engine, or the like. The driven member 32 and the fixed member 34 are, for example, a part of the driven machine. The output member is connected to the driven member 32 using a connection member (not illustrated) such as a bolt or a rivet. The fixing member is connected to the fixed member 34 using a connection member such as a bolt or a rivet.

Figure 2:
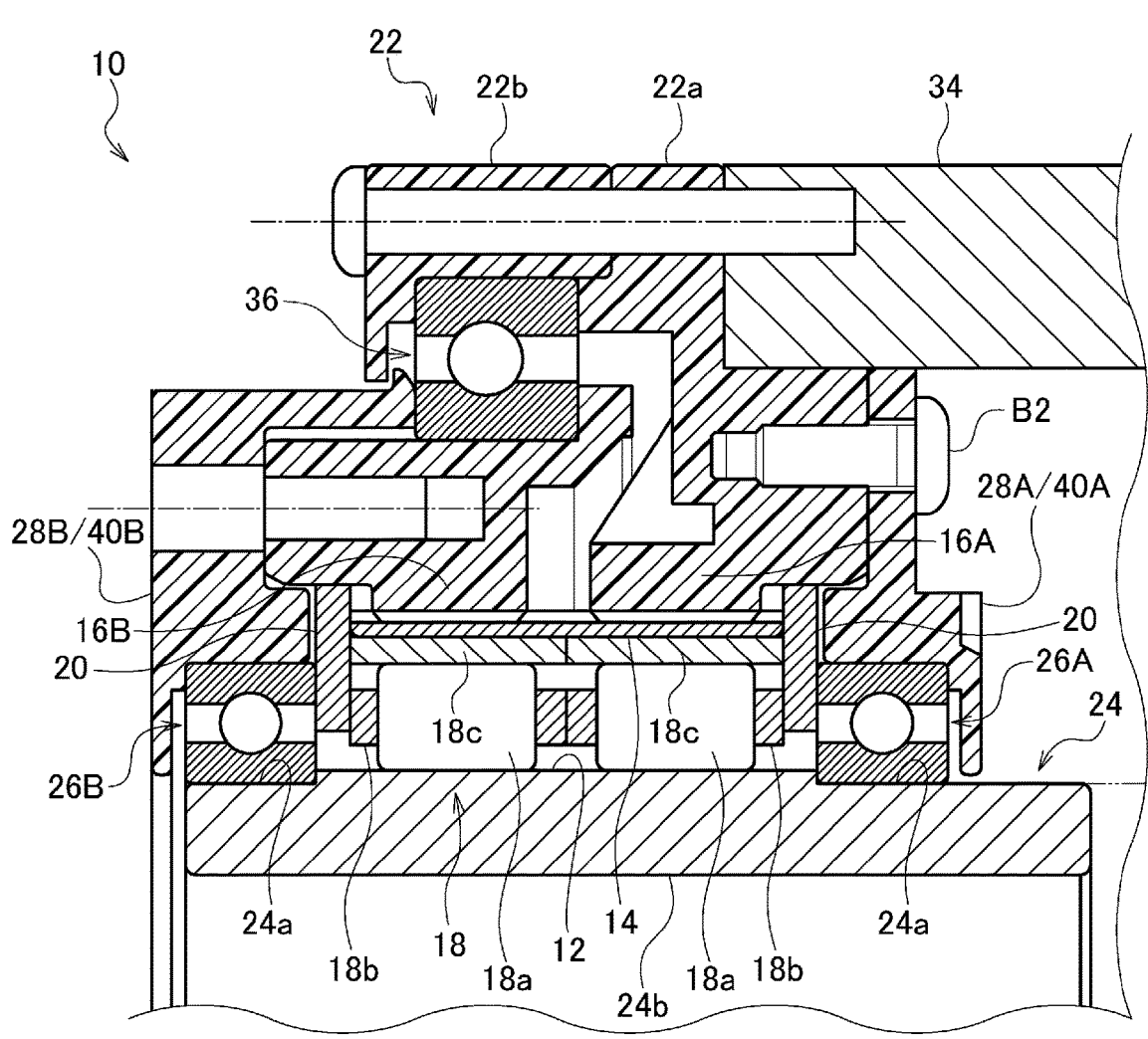
FIG. 2 is an enlarged view of FIG. 1.

FIG. 2 will be referred to. The wave generator 12 is a part of the wave generator shaft 24. The wave generator shaft 24 includes, in addition to the wave generator 12, shaft portions 24a provided on both sides of the wave generator 12 in the axial direction. A hollow portion 24b that passes through a center portion of the wave generator shaft 24 in the axial direction is formed in the center portion of the wave generator shaft 24. In a cross section of the wave generator 12 perpendicular to the axial direction, a shape of an opposite periphery portion (here, an outer periphery portion) of the wave generator 12 that is opposite to the bending gear 14 in the radial direction is an ellipse, and a shape of an opposite periphery portion of the shaft portion 24a is a circle. Here, "ellipse" is not limited to an ellipse in a geometrically strict sense and also includes an approximately elliptical shape.

The bending gear 14 is a tubular member having flexibility of being bent and deformed following rotation of the wave generator 12. One of the bending gear 14 or the meshing gears 16A and 16B is an external gear, and the other is an internal gear. Here, an example in which the bending gear 14 is an external gear and the meshing gears 16A and 16B are internal gears will be described.

The meshing gears 16A and 16B have stiffness to an extent of not being bent and deformed following rotation of the wave generator 12. The meshing gears 16A and 16B include the first meshing gear 16A that meshes with teeth (external teeth) of an input side portion of the bending gear 14, and the second meshing gear 16B that meshes with teeth (internal teeth) of a counter-input side portion of the bending gear 14. The first meshing gear 16A has the number of teeth (for example, 102) different from the number of teeth (for example, 100) of the bending gear 14, and the second meshing gear 16B has the number of internal teeth that is the same number as the number of external teeth of the bending gear 14.

The wave generator bearing 18 includes a plurality of rolling elements 18a and a retainer 18b that holds positions of the plurality of rolling elements 18a. While an example in which the rolling element 18a of the present embodiment is a roller is illustrated, a specific example of the rolling element 18a is not particularly limited, and various rolling elements such as spherical elements may be employed. The wave generator bearing 18 of the present embodiment includes a dedicated outer ring 18c on which the rolling element 18a rolls. Alternatively, the wave generator bearing 18 may not include the dedicated outer ring 18c, and the rolling element 18a may roll on an inner peripheral surface of an outer side member (here, the bending gear 14) opposite to the rolling element 18a on a radial outer side. The wave generator bearing 18 of the present embodiment does not include a dedicated inner ring on which the rolling element 18a rolls, and the rolling element 18a rolls on an outer peripheral surface of an inner side member (here, the wave generator 12) opposite to the rolling element 18a on a radial inner side. Alternatively, the wave generator bearing 18 may include the dedicated inner ring on which the rolling element 18a rolls. The wave generator bearing 18 of the present embodiment is a multiple row bearing including the outer rings 18c and the rolling elements 18a in two rows.

The regulating member 20 of the present embodiment is individually disposed on both sides of the bending gear 14 in the axial direction. The regulating member 20 regulates a movement of the bending gear 14 in the axial direction by coming into contact with the bending gear 14 from the axial direction. The regulating member 20 of the present embodiment regulates a movement of the bending gear 14 in the axial direction by coming into contact with the bearings 26A and 26B disposed on an opposite side to the bending gear 14 in the axial direction with respect to the regulating member 20.

The casing 22 of the present embodiment includes an input side casing member 22a and a counter-input side casing member 22b. The input side casing member 22a and the counter-input side casing member 22b are connected by a connection member B1 (refer to FIG. 1) such as a bolt. The input side casing member 22a doubles as the first meshing gear 16A and is in contact with the fixed member 34. The counter-input side casing member 22b is disposed on a radial outer side of the second meshing gear 16B. A main bearing 36 is disposed between the casing 22 and the second meshing gear 16B. While the main bearing 36 is illustrated as a ball bearing, a specific example of the main bearing 36 is not particularly limited and may be a roller bearing, a crossed roller bearing, an angular ball bearing, a tapered bearing, or the like.

The bearings 26A and 26B include the first bearing 26A disposed on the input side and the second bearing 26B disposed on the counter-input side. The bearings 26A and 26B of the present embodiment include a plurality of rolling elements 26a and a dedicated outer ring 26b and a dedicated inner ring 26c on which the plurality of rolling elements 26a roll. While an example in which the bearings 26A and 26B are ball bearings is illustrated, specific examples of the bearings 26A and 26B are not particularly limited and may be various bearings such as a roller bearing.

The bearing housings 28A and 28B include the first bearing housing 28A that supports the first bearing 26A, and the second bearing housing 28B that supports the second bearing 26B. The first bearing housing 28A is disposed on the input side of the bending gear 14 in the axial direction and covers the bending gear 14 from the input side. The first bearing housing 28A is connected to the first meshing gear 16A by a connection member B2 such as a bolt. The second bearing housing 28B is disposed on the counter-input side of the bending gear 14 in the axial direction and covers the bending gear 14 from the counter-input side. The second bearing housing 28B is connected to the second meshing gear 16B by a connection member B3 (refer to FIG. 1) such as a bolt.

Operation of the gear device 10 of the present embodiment will be described. In a case where the wave generator 12 rotates, the bending gear 14 is bent and deformed in an elliptical shape corresponding to a shape of the wave generator 12. In a case where the bending gear 14 is bent and deformed in such a manner, a meshing position between the bending gear 14 and the meshing gears 16A and 16B changes in a rotation direction of the wave generator 12. At this point, each time the meshing position between the bending gear 14 and the first meshing gear 16A having different numbers of teeth makes a round trip, the meshing teeth gradually shift in the peripheral direction. Consequently, one of the bending gear 14 or the first meshing gear 16A (in the present embodiment, the bending gear 14) rotates, and an axial rotation component of the bending gear 14 is acquired by the output member as the output rotation. In the present embodiment, the bending gear 14 and the second meshing gear 16B synchronize with each other because of having the same number of teeth as each other, and the axial rotation component of the bending gear 14 is acquired by the second bearing housing 28B as the output member through the second meshing gear 16B, which synchronizes with the bending gear 14. At this point, the output rotation that is changed in speed (here, decreased in speed) with a ratio of change corresponding to a difference in number of teeth between the bending gear 14 and the first meshing gear 16A with respect to the input rotation input into the wave generator 12 is acquired by the output member.

Here, the meshing gears 16A and 16B are formed of a first resin. Accordingly, weight saving of the meshing gears 16A and 16B can be aimed. In satisfying this condition, the meshing gears 16A and 16B of the present embodiment are formed of a composite resin material using a base resin (first resin) and other materials. Accordingly, high intensity of the meshing gears 16A and 16B can be aimed. Alternatively, the meshing gears 16A and 16B may be formed of a single resin material using only the first resin. The meshing gears 16A and 16B of the present embodiment are formed of a fiber-reinforced resin obtained by including reinforcement fibers in the base resin as the composite resin material. In the present embodiment, the reinforcement fibers of the meshing gears 16A and 16B employ carbon fibers that have excellent thermal conductivity. Alternatively, the reinforcement fibers of the meshing gears 16A and 16B may employ various types of reinforcement fibers such as a glass fiber, an aramid fiber, a polyethylene fiber, a Zylon fiber, and a boron fiber.

A glass transition point (glass transition temperature: Tg) is known as a value that is an index of thermostability of a resin. The glass transition point here refers to a value that is a boundary between a glass state and a rubber state of a resin. The glass transition point is measured using, for example, differential scanning calorimetry complying with JIS K 7121.

A glass transition point of PEEK, while depending on a grade of PEEK, falls within a range of 143° C. to 160° C. A condition for the meshing gears 16A and 16B is that the meshing gears 16A and 16B are formed of the first resin having a glass transition point lower than 140° C. This means that the meshing gears 16A and 16B are formed of the first resin having lower thermostability than PEEK. This condition of lower than 140° C. defines a glass transition point that is lower than the glass transition point of PEEK to at least a certain extent using a numerical value as a reference. In satisfying this condition, a glass transition point of the base resin (first resin) need only be lower than 140° C. in a case where the meshing gears 16A and 16B are formed of a composite resin material. In addition, in a case where the meshing gears 16A and 16B are formed of a single resin material, a glass transition point of the single resin (first resin) constituting the meshing gears 16A and 16B need only be lower than 140° C. The use of the glass transition point corresponding to the composite resin material and to the single resin material also applies to the case of a second resin, described later.

In the present embodiment, semi-aromatic polyamide is employed as the first resin having a glass transition point lower than 140° C. In the case of using semi-aromatic polyamide, the glass transition point Tg, while depending on a composition of the semi-aromatic polyamide, can be set to fall within a range of 90° C. to 135° C. For example, semi-aromatic polyamide such as polyamide 6T/6-6 (a copolymer of C6 diamine/adipic acid/terephthalic acid; Tg: 90° to 110° C.), polyamide 6T/6I (a copolymer of C6 diamine/isophthalic acid/terephthalic acid; Tg: approximately 125° C.), polyamide 6T/6I/6-6 (a copolymer of C6 diamine/adipic acid/isophthalic acid/terephthalic acid; Tg: approximately 120° C.), polyamide 6T/M-5T (a copolymer of C6 diamine/methylpentane/diamine/terephthalic acid; Tg: approximately 135° C.), or polyamide 9T (a copolymer of C9 diamine/terephthalic acid; Tg: approximately 125° C.) may be employed. Alternatively, in setting the glass transition point to be lower than 140° C., a resin such as polyamide 6 (PA6; Tg: approximately 50° C.), polyamide 66 (PA66; Tg: approximately 50° C.), polyethylene terephthalate (PET; Tg: approximately 70° C.), polyvinyl chloride (PVC; Tg: approximately 80° C.), polystyrene (PS; Tg: approximately 100° C.), polymethyl methacrylate (PMMA; Tg: approximately 70° C.), or polyphenylene sulfide (PPS; Tg: approximately 88° C.) may be employed. The resin illustrated here is merely an example of the first resin, and other various types of resins may be employed as the first resin as long as the glass transition point can be set to be lower than 140° C.

While a lower limit value of the glass transition point of the first resin is not particularly limited, the lower limit value is preferably higher than or equal to 80° C., more preferably higher than or equal to 90° C., and still more preferably higher than or equal to 100° C. In the gear device 10 of the present embodiment, in a case where the lower limit value of the glass transition point is 80° C., the effect of the heat on durability can be suppressed to the same extent as that in the case of using PEEK for an application in which an increase in temperature of the gear pair is decreased. The application here in which an increase in temperature is decreased refers to an application in which an operation condition (a continuous operation time or the like) or a load is not strict. In a case where the lower limit value of the glass transition point is 90° C., the effect of the heat on the durability can be suppressed to the same extent as that in the case of using PEEK even for use in many applications that can be implemented using PEEK. In a case where the lower limit value of the glass transition point is higher than or equal to 100° C., the effect of the heat on the durability can be suppressed to the same extent as that in the case of using PEEK even for use in most applications that can be implemented using PEEK.

Each of the bending gear 14, the wave generator 12, and the wave generator bearing 18 is formed of a high thermal conductivity material having higher thermal conductivity (W/(m·K)) than the first resin of the meshing gears 16A and 16B. The bending gear 14 is formed of a first high thermal conductivity material, the wave generator 12 is formed of a second high thermal conductivity material, and the wave generator bearing 18 is formed of a third high thermal conductivity material. The second high thermal conductivity material has higher thermal conductivity than the first high thermal conductivity material. The second high thermal conductivity material has higher thermal conductivity than the third high thermal conductivity material. The first high thermal conductivity material has a higher Young's modulus (N/mm 2) than the second high thermal conductivity material. The third high thermal conductivity material has a higher Young's modulus than the second high thermal conductivity material.

As a material satisfying such a condition, for example, the first high thermal conductivity material is formed of nickel chromium molybdenum steel, the second high thermal conductivity material is formed of aluminum alloy, and the third high thermal conductivity material is formed of high-carbon chromium bearing steel. That is, the first and third high thermal conductivity materials are formed of an iron-based material such as cast iron or steel, and the second high thermal conductivity material is formed of an aluminum-based material. The iron-based material and the aluminum-based material here refer to a material having the mentioned metal as a main component and include not only a material consisting of only the metal but also alloy having the metal as a main component.

A specific example of each high thermal conductivity material is not particularly limited as long as a magnitude relationship in thermal conductivity described here is satisfied. For example, the first and third high thermal conductivity materials may be formed of an iron-based material, chromium, or the like, and the second high thermal conductivity material may be formed of an iron-based material, an aluminum-based material, copper, silver, gold, or the like. In such a case where the high thermal conductivity material is metal, each high thermal conductivity material, for example, has thermal conductivity of 10 times or higher than that of the first resin of the bending gear 14. In addition, each of the first to third high thermal conductivity materials may be formed of various types of metal. Alternatively, any one or more of the first to third high thermal conductivity materials may be formed of a resin, and the other may be formed of metal. Alternatively, all of the first to third high thermal conductivity materials may be formed of a resin. In forming the high thermal conductivity material of a material such as metal (including an iron-based material, an aluminum-based material, and the like) in such a manner, a main material of the high thermal conductivity material need only be formed of the mentioned material, or the high thermal conductivity material may be formed of a composite material (for example, fiber-reinforced metal) of the main material (metal or the like) and other materials.

In the present embodiment, the entire wave generator shaft 24 including the wave generator 12 is formed of the second high thermal conductivity material. In forming the wave generator bearing 18 of the third high thermal conductivity material, a constituting member (here, the rolling element 18a, the retainer 18b, and the outer ring 18c) that is a separate element from the wave generator 12 and from the bending gear 14 among constituting members of the wave generator bearing 18 need only be formed of the third high thermal conductivity material. At this point, a plurality of constituting members of the wave generator bearing 18 may be formed of the third high thermal conductivity materials having different thermal conductivity from each other. Even in this case, the thermal conductivity of the second high thermal conductivity material need only be higher than each of the third high thermal conductivity materials having different thermal conductivity. In addition, since the rolling element 18a and the outer ring 18c mainly contribute to transfer of the heat generated in the meshing part of the gear pair, a material of the retainer 18b is not important. Thus, in forming the wave generator bearing 18 of the third high thermal conductivity material, at least the rolling element 18a and the outer ring 18c may be formed of the third high thermal conductivity material, and the retainer 18b may be formed of, for example, a resin having low thermal conductivity.

An effect of the above gear device 10 will be described. The meshing gears 16A and 16B are formed of the first resin having a glass transition point lower than 140° C., that is, the first resin having a lower thermostability than PEEK having a glass transition point falling within a range of 143° C. to 160° C. Thus, a wide selection of an inexpensive usable material can be provided, compared to that in the case of using PEEK, and a low cost of the meshing gears 16A and 16B can be aimed by selecting an inexpensive material. In "aiming a low cost", implementation of a low cost is not essential as long as a degree of difficulty in implementing a low cost can be decreased, compared to that in the case of using PEEK by providing a wide selection of inexpensive usable materials.

In addition, the wave generator 12 is formed of the second high thermal conductivity material having higher thermal conductivity than the first high thermal conductivity material constituting the bending gear 14. Accordingly, it is possible to promote thermal conduction of the heat generated in the gear pair through the wave generator 12, compared to that in the case of setting the wave generator 12 to have the same thermal conductivity as the bending gear 14, and to increase thermal dissipation that is release of the heat of the gear pair to the outside. At this point, for example, the heat generated in the gear pair can be thermally conducted in an order of bending gear 14→wave generator bearing 18→wave generator 12 and then be released by thermal conduction to the drive source 30 (first external member) on the outside or be released by thermal radiation to an external space around the wave generator 12. By increasing thermal dissipation of the gear pair (that is, the meshing gears 16A and 16B) in such a manner, a temperature of the gear pair can be decreased, compared to that in the case of setting the wave generator 12 to have the same thermal conductivity as the bending gear 14. Furthermore, even in a case where thermostability of the meshing gears 16A and 16B is decreased, the effect of the heat on durability of the meshing gears 16A and 16B can be suppressed, compared to that in the case of setting the wave generator 12 to have the same thermal conductivity as the bending gear 14. Consequently, it is possible to suppress the effect on the durability of the meshing gears 16A and 16B while aiming a low cost of the meshing gears 16A and 16B. As described above, the gear device 10 of the present embodiment implements the above remarkable effect by simultaneously and inseparably including all of the "meshing gears 16A and 16B formed of the first resin having a glass transition point lower than 140° C.", the "bending gear 14 formed of the first high thermal conductivity material having higher thermal conductivity than the first resin of the meshing gears 16A and 16B", and the "wave generator 12 formed of the second high thermal conductivity material having higher thermal conductivity than the first high thermal conductivity material constituting the bending gear 14".

In the present specification, in the case of "compared to a case where A is set to have the same properties (thermal conductivity, a Young's modulus, and the like) as B", properties of each constituting member of the gear device 10 are the same except for A between two cases to be compared (for example, a case where A is set to have higher thermal conductivity than B and a case where A is set to have the same thermal conductivity as B). For example, in the case of "compared to a case where the wave generator 12 is set to have the same thermal conductivity as the bending gear 14" described in the previous paragraph, thermal conductivity of each constituting member of the gear device 10 is the same except for the wave generator 12 between a case where the wave generator 12 is set to have higher thermal conductivity than the bending gear 14 and a case where the wave generator 12 is set to have the same thermal conductivity as the bending gear 14.

The second high thermal conductivity material constituting the wave generator 12 has higher thermal conductivity than the third high thermal conductivity material constituting the wave generator bearing 18. Thus, it is possible to further promote thermal conduction of the heat generated in the gear pair through the wave generator 12, compared to that in the case of setting the wave generator 12 to have the same thermal conductivity as the wave generator bearing 18, and to further increase thermal dissipation that is release of the heat of the gear pair to the outside. Furthermore, the effect of the heat on the durability of the meshing gears 16A and 16B can be further suppressed.

The first high thermal conductivity material constituting the bending gear 14 has a higher Young's modulus than the second high thermal conductivity material constituting the wave generator 12. Thus, it is possible to secure intensity of the first high thermal conductivity material and to increase the durability of the bending gear 14, compared to the case of setting the first high thermal conductivity material to have the same Young's modulus as the second high thermal conductivity material.

Next, other features of the gear device 10 of the embodiment will be described. The gear device 10 includes connected members 40A and 40B that are connected to the meshing gears 16A and 16B by the connection members B2 and B3. The connected members 40A and 40B include the first connected member 40A that is connected to the first meshing gear 16A by the first connection member B2, and the second connected member 40B that is connected to the second meshing gear 16B by the second connection member B3. While the connection members B2 and B3 of the present embodiment are bolts, specific examples of the connection members B2 and B3 are not particularly limited and may be rivets or the like. In the present embodiment, the first connected member 40A is the first bearing housing 28A, and the second connected member 40B is the second bearing housing 28B. Specific examples of the connected members 40A and 40B are not particularly limited and may be covers or the like that cover the bending gear 14 without supporting the bearings 26A and 26B.

The first connected member 40A is formed of the second resin having a lower glass transition point than the first resin constituting the first meshing gear 16A. The second connected member 40B is formed of the second resin having a lower glass transition point than the first resin constituting the second meshing gear 16B. In implementing this, the glass transition point of the first resin may be set to be higher than or equal to 50° C., and the glass transition point of the second resin may be set to be lower than 50° C. As the second resin satisfying such a condition of the glass transition point, not only the above various types of resins but also polyethylene (PE; Tg: −125° C.), polypropylene (PP; Tg: 0° C.), polyacetal (POM; Tg: −50° C.), and the like may be employed. Accordingly, a wide selection of inexpensive usable materials can be provided, compared to the case of setting the second resin to have the same glass transition point as the first resin, and a low cost of the gear device 10 can be aimed by selecting an inexpensive material.

The first resin constituting each of the first meshing gear 16A and the second meshing gear 16B may be formed of the same type of resin or may be formed of different types of resins. Similarly, the second resin constituting each of the first connected member 40A and the second connected member 40B may be formed of the same type of resin or may be formed of different types of resins.

In the present embodiment, the regulating member 20 and each of the bearings 26A and 26B are also formed of a high thermal conductivity material having higher thermal conductivity than the first resin of the meshing gears 16A and 16B. The regulating member 20 is formed of a fourth high thermal conductivity material, and the bearings 26A and 26B are formed of a fifth high thermal conductivity material.

The fourth high thermal conductivity material has higher thermal conductivity than the first high thermal conductivity material constituting the bending gear 14. In addition, the fourth high thermal conductivity material has higher thermal conductivity than the third high thermal conductivity material constituting the wave generator bearing 18. In addition, the second high thermal conductivity material constituting the wave generator 12 has higher thermal conductivity than the fifth high thermal conductivity material. The first high thermal conductivity material and the third high thermal conductivity material have a higher Young's modulus than the fourth high thermal conductivity material. The fifth high thermal conductivity material has a higher Young's modulus than the second high thermal conductivity material and the fourth high thermal conductivity material. As a material satisfying such a condition, for example, the fourth high thermal conductivity material is formed of an aluminum-based material, and the fifth high thermal conductivity material is formed of an iron-based material such as high-carbon chromium bearing steel. A specific example of each high thermal conductivity material is not particularly limited as long as a magnitude relationship in thermal conductivity described here is satisfied, as described above. In forming the regulating member 20 of the fourth high thermal conductivity material, abrasion-resistant coating may be provided on a location on which the bending gear 14 slides in the regulating member 20. The abrasion-resistant coating is a film of, for example, molybdenum disulfide or graphite.

In such a manner, the fourth high thermal conductivity material constituting the regulating member 20 has higher thermal conductivity than the first high thermal conductivity material constituting the bending gear 14. Thus, it is possible to promote thermal conduction of the heat generated in the gear pair through the regulating member 20, compared to that in the case of setting the regulating member 20 to have the same thermal conductivity as the bending gear 14, and to further increase thermal dissipation that is release of the heat of the gear pair to the outside. Furthermore, the effect of the heat on the durability of the meshing gears 16A and 16B can be further suppressed. At this point, the heat generated in the gear pair can be thermally conducted in an order of, for example, bending gear 14→regulating member 20→bearings 26A and 26B→wave generator shaft 24 and then be released to the outside as described above.

Next, a modification example of each component described so far will be described.

A specific type of the bending meshing type gear device 10 is not particularly limited and may be a cup type or a silk hat type in addition to a tubular type. The internal gear may be used as the bending gear 14 instead of the external gear, and the external gear may be used as the meshing gears 16A and 16B instead of the internal gear. The casing 22 may be used as the output member instead of the bearing housings 28A and 28B, and the bearing housings 28A and 28B may be used as the fixing member instead of the casing 22. An example in which the gear device 10 functions as a speed reducer has been described. In this case, the wave generator 12 may be used as the input member, and the bearing housings 28A and 28B or the casing 22 may be used as the output member. Alternatively, the gear device 10 may function as a speed increaser. In this case, the wave generator 12 may be used as the output member, and the bearing housings 28A and 28B or the casing 22 may be used as the input member.

As long as a condition that the second high thermal conductivity material of the wave generator 12 has higher thermal conductivity than the first high thermal conductivity material of the bending gear 14, a magnitude relationship in thermal conductivity between each of other high thermal conductivity materials is not particularly limited. For example, the second high thermal conductivity material of the wave generator 12 may have lower thermal conductivity than the third high thermal conductivity material of the wave generator bearing 18. In addition, the fourth high thermal conductivity material of the regulating member 20 may have lower thermal conductivity than the first high thermal conductivity material.

Similarly, a magnitude relationship in Young's modulus between each of the high thermal conductivity materials is not particularly limited. For example, the first and third high thermal conductivity materials may have a lower Young's modulus than the second high thermal conductivity material.

The glass transition point of the second resin constituting the connected members 40A and 40B is not particularly limited and may be a higher glass transition point than the first resin.

The embodiment and the modification example described above are merely examples. A technical idea that is an abstract of the embodiment and the modification example should not be construed as being limited to the contents of the embodiment and the modification example. The contents of the embodiment and the modification example can be subjected to many design changes such as change, addition, and deletion of components. In the above embodiment, contents that can be subjected to such design changes are highlighted with the term "embodiment". However, design changes are also allowed for contents without the term.

It should be understood that the invention is not limited to the above-described embodiment, but may be modified into various forms on the basis of the spirit of the invention. Additionally, the modifications are included in the scope of the invention.

What is claimed is:

1. A gear device comprising:
   a wave generator;
   a bending gear that is bent and deformed by the wave generator;
   a meshing gear that meshes with the bending gear, and
   a wave generator bearing that is disposed between the wave generator and the bending gear,
   wherein the wave generator is provided separately from rolling elements of the wave generator bearing,
   wherein the meshing gear is formed of a first resin having a glass transition point lower than about 140° C.,
   the bending gear is formed of a first high thermal conductivity material having higher thermal conductivity than the first resin, and the wave generator is formed of a second high thermal conductivity material having higher thermal conductivity than the first high thermal conductivity material; and
   wherein the first high thermal conductivity material has a higher Young's modulus than the second high thermal conductivity material.

2. The gear device according to claim 1,
   wherein the first high thermal conductivity material is an iron-based material, and
   the second high thermal conductivity material is an aluminum-based material.

3. The gear device according to claim 1, further comprising:
   a wave generator shaft including the wave generator, and shaft portions provided on both sides of the wave generator in an axial direction.

4. The gear device according to claim 3, wherein a hollow portion that passes through a center portion of the wave generator shaft in the axial direction of the wave generator is formed in the center portion of the wave generator shaft.

5. The gear device according to claim 3, wherein a shape of an opposite periphery portion of the wave generator that is opposite to the bending gear in a radial direction is substantially an ellipse, and a shape of an opposite periphery portion of the shaft portion is substantially a circle, in a cross section of the wave generator perpendicular to the axial direction.

6. The gear device according to claim 1, wherein the first resin is semi-aromatic polyamide.

7. A gear device comprising:
   a wave generator;
   a bending gear that is bent and deformed by the wave generator;
   a meshing gear that meshes with the bending gear, and
   a wave generator bearing that is disposed between the wave generator and the bending gear,
   wherein the wave generator is provided separately from rolling elements of the wave generator bearing,
   wherein the meshing gear is formed of a first resin having a glass transition point lower than about 140° C.,
   the bending gear is formed of a first high thermal conductivity material having higher thermal conductivity than the first resin, and
   the wave generator is formed of a second high thermal conductivity material having higher thermal conductivity than the first high thermal conductivity material,
   wherein the wave generator bearing is formed of a third high thermal conductivity material having higher thermal conductivity than the first resin, and
   the second high thermal conductivity material has higher thermal conductivity than the third high thermal conductivity material.

8. The device according to claim 7, wherein the wave generator bearing includes a plurality of rolling elements, and a retainer that holds positions of the plurality of rolling elements.

9. The device according to claim 8, wherein the wave generator bearing further includes a dedicated outer ring on which the rolling element rolls.

10. The gear device according to claim 9, wherein the rolling element, the retainer, and the outer ring are formed of the third high thermal conductivity materials having different thermal conductivity from each other.

11. A gear device comprising:
   a wave generator;

13                                                    14 a bending gear that is bent and deformed by the wave generator;

a meshing gear that meshes with the bending gear, and a wave generator bearing that is disposed between the wave generator and the bending gear, wherein the wave generator is provided separately from rolling elements of the wave generator bearing, wherein the meshing gear is formed of a first resin having a glass transition point lower than about 140° C.

the bending gear is formed of a first high thermal conductivity material having higher thermal conductivity than the first resin, and the wave generator is formed of a second high thermal conductivity material having higher thermal conductivity than the first high thermal conductivity material;

the gear device further comprising:

a connected member that is connected to the meshing gear, wherein the connected member is formed of a second resin having a lower glass transition point than the first resin.

12. A gear device comprising:

a wave generator;

a bending gear that is bent and deformed by the wave generator;

a meshing gear that meshes with the bending gear, and a wave generator bearing that is disposed between the wave generator and the bending gear, wherein the wave generator is provided separately from rolling elements of the wave generator bearing, wherein the meshing gear is formed of a first resin having a glass transition point lower than about 140° C.

the bending gear is formed of a first high thermal conductivity material having higher thermal conductivity than the first resin, the wave generator is formed of a second high thermal conductivity material having higher thermal conductivity than the first high thermal conductivity material; and wherein the first resin has a glass transition point higher than or equal to 100° C.

13. A gear device comprising:

a wave generator;

a bending gear that is bent and deformed by the wave generator;

a meshing gear that meshes with the bending gear, and a wave generator bearing that is disposed between the wave generator and the bending gear, wherein the wave generator is provided separately from rolling elements of the wave generator bearing, wherein the meshing gear is formed of a first resin having a glass transition point lower than about 140° C., the bending gear is formed of a first high thermal conductivity material having higher thermal conductivity than the first resin, the wave generator is formed of a second high thermal conductivity material having higher thermal conductivity than the first high thermal conductivity material, further comprising:

a regulating member that regulates a movement of the bending gear in an axial direction, wherein the regulating member is formed of a fourth high thermal conductivity material having higher thermal conductivity than the first high thermal conductivity material.

14. The gear device according to claim 13, wherein the regulating member comes into contact with a bearing disposed on an opposite side to the bending gear in the axial direction with respect to the regulating member.

*   *   *   *   *